United States Patent [19]

Czajka

[11] 3,944,706

[45] Mar. 16, 1976

[54] SELF-BONDING POLYETHYLENE TRIMELLITATE IMIDE VARNISH

[75] Inventor: Thomas S. Czajka, Wheaton, Ill.

[73] Assignee: Standard Oil Company, Chicago, Ill.

[22] Filed: Aug. 1, 1974

[21] Appl. No.: 493,558

[52] U.S. Cl. .............. 428/383; 260/78 TF; 427/116; 427/118; 428/458

[51] Int. Cl.[2] ........................ H01B 3/30; C08G 73/10

[58] Field of Search .................. 117/232, 218, 128.4; 260/78 TF; 174/110 SR, 120 C; 427/117, 116, 118; 428/379, 383, 458

[56] References Cited

UNITED STATES PATENTS

| | | | |
|---|---|---|---|
| 3,060,191 | 10/1962 | Kolb et al. | 260/78 TF X |
| 3,428,486 | 2/1969 | George | 117/232 X |
| 3,451,848 | 6/1969 | Stephens | 117/232 X |
| 3,546,152 | 12/1970 | Bolton | 117/232 X |
| 3,726,712 | 4/1973 | Rieck et al. | 117/232 X |

*Primary Examiner*—Ralph Husack
*Attorney, Agent, or Firm*—William H. Magidson; Arthur G. Gilkes; William T. McClain

[57] ABSTRACT

Magnet wire bearing a poly(ethylene trimellitate imide) varnish coating which is capable of forming a unitary structure after producing a fabricated article from the coated wire where the poly(ethylene trimellitate imide) cures on heating or application of electrical current.

7 Claims, No Drawings

SELF-BONDING POLYETHYLENE TRIMELLITATE IMIDE VARNISH

This invention relates to wire bearing a self-bonding varnish coating. More particular, this invention relates to magnet wire bearing a self-bonding poly(ethylenetrimellitate imide) coating.

Magnet wire is an essential element of many electrical components, such as armatures, stators, coils, etc. Typically, the bare magnet wire is insulated by coating with one or more layers of a magnet wire enamel. N.E.M.A. standards require that the insulating enamel layer must be flexible and thermally stable under the conditions of use and that the coated wire must have specific mechanical properties. The thermal rating of magnet wire enamels is normally determined by ASTM D-2307 (1968). Magnet wire components used in small appliances and under the hood of automobiles generally require relatively high thermal ratings and correspondingly the most expensive enamels. Accordingly, various types of enamels are employed depending upon the thermal properties required by the end use. The enameled magnet wire is fabricated into the desired electrical component, dipped into a varnish and the varnish heat fused. The varnish is necessary to hold the wound magnet wire in place in the electrical component and enhances to some extent the insulating value of the finished component.

There has been considerable interest in avoiding the relatively time consuming varnish dipping step. Accordingly, industry would like self-bonding magnet wire varnishes where (1) the varnish can be applied directly to the unwound enameled magnet wire, (2) the varnish layer provides a tack-free top coating on the enameled wire which maintains its integrity during fabrication (winding, assembly, etc.), (3) the varnished wire passes the N.E.M.A. standards for enameled wire and (4) the varnish layer can be heat fused after fabrication to form essentially the same unitary electrical components as the prior art process. The advantage of a self-bonding varnish is apparent when one considers the speed at which the wire can be coated with varnish as opposed to dipping and handling numerous fabricated parts.

Self-bonding epoxy varnishes have been developed. However, these epoxy varnishes are limited to end uses having a rating of 130°C or below. Above about 130°C, the epoxy breaks down. Until now there have been no suitable self-bonding magnet wire varnishes developed for the class 155 rated (class F) enamels or higher rated enamels. Accordingly, there is a need for self-bonding varnishes for the polyester enamels, which have a class F rating (155°C), polyester or polyesterimide enamels, which have a class H rating (180°C) and for the polyimide and polyamideimide enamels, which have a 220°C rating. These enamels presently require that the fabricated element be dipped into a suitable varnish prior to heat curing.

The general object of this invention is to provide new magnet wiring bearing a continuous self-bonding varnish top coat. A more specific object is to provide magnet wire bearing a self-bonding varnish top coat and polyester, polyesterimide, polyimide and polyamideimide enamel subbing layers. Other objects appear hereinafter.

I have now found that the objects of this invention can be attained by employing poly(ethylenetrimellitate imides) having an I.V. of at least 0.3 dl/g as a top coat varnish. The poly(ethylenetrimellitate imides) have excellent thermal properties (stable at over 220°C), can be applied directly to enameled or subbed magnet wire and dry to a non-tacky coating. The poly(ethylenetrimellitate imide) coated magnet wire passes the N.E.M.A. standards and the varnish fuses on heating the fabricated elements to the desired unitary structure. For simplicity the articles of this invention can be viewed as magnet wire bearing a self-bonding top coat varnish comprising a poly(ethylenetrimellitate imide) having an I.V. of at least 0.3. However, the magnet wire usually comprises one or more layers of one or more relatively thermally stable subbing layers, such as one or more polyester, polyimide, polyesterimide or polyamideimide subbing layers.

For the purpose of this invention, the inherent viscosity is measured at 25°C and 0.5% w/v in 60/40 w/w phenol/1, 1, 2, 2-tetrachloroethane.

The poly(ethylenetrimellitate imides) of this invention have an I.V. (inherent viscosity) of at least 0.3 dl/g, preferably at least 0.4 dl/g. If the I.V. is below 0.3, the coating lacks physical properties and the varnished magnet wire cannot be processed easily.

The poly(ethylenetrimellitate imides) can be produced by polymerizing N-hydroxyethyl trimellitic acid imide in the presence of a suitable catalyst. The N-hydroxyethyl trimellitic acid imide can be prepared separately and charged to the polymerization apparatus. Preferably trimellitic anhydride and/or acid and ethanol amine are reacted together to form N-hydroxyethyl trimellitic acid imide in the manner described in U.S. Pat. 3,060,191 and allowed Ser. No. 432,569, filed Jan. 11, 1974 which are incorporated by reference, and the resultant reaction product polymerized.

In general, the N-hydroxyethyl trimellitic acid imide comprises at least 90 mol percent of the mer units in the polymer and preferably 100 mol percent of the mer units. Other things being equal, the homopolymeric poly (ethylenetrimellitate imide) has a higher melting point than the copolymeric products. Suitable other N-hydroxyalkyl trimellitic acid imide comonomers include N-hydroxyethyl trimellitic acid imide, N-hydroxypropyl trimellitic acid imide, N-hydroxybutyl trimellitic acid imide, N-hydroxyhexyl trimellitic acid imide, N-hydroxyoctyl trimellitic acid imide, etc. Two or more of these monomers can be copolymerized with the N-hydroxyethyl trimellitic acid imide. If desired the N-hydroxyethyl trimellitic acid imide can be copolymerized with up to 10 mol percent of one or more comonomers capable of reacting as if it had both terminal acyl functionality and -XH functionality wherein X stands $$-O- \text{ or } -\overset{\displaystyle H}{\overset{|}{N}}-.$$

Suitable comonomers of this type include amino acids, such as aminoacetic acid, aminohexanoic acid, aminobenzoic acid, etc.; lactams, such as caprolactam, etc.; lactones, such as beta-propiolactone, caprolactone, etc.; hydroxycarboxylic acids such as salicylic acid, glycollic acid, etc.; half-esters of dicarboxylic acids and glycols, such as the half-ester of ethylene glycol and maleic anhydride, etc.

Catalysts suitable for producing the poly(ethylenetrimellitate imides) include antimony trioxide, antimony tributoxide, tetrabutyl titanate, tetra-isopropyl titanate, stannous salts, such as stannous laurate and various organotin compounds, such as dibutyltin maleate, dibutyltin dilaurate, dibutyltin diacetate, tributyltin adipate, dibutyltin salicylate, dibutylin dichloride, etc. Of these, the organotin salts and stannous salts of mono and dicarboxylic acids are the most versatile. For example, the antimony catalysts are not very effective in solid state polymerization, while the tin and titanate catalysts can be used advantageously in both states. The tin catalysts have the advantage over the titanate catalysts in that it is possible to produce polymers having an I.V. of up to about 0.7 dl/g in a single stage melt polymerization whereas the maximum I.V. attainable with titanate catalysts is about 0.4 dl/g in a single stage melt polymerization. The higher I.V. attainable with the tin compounds is due to the fact that higher esterification temperatures can be employed without substantial polymer degradation. This is apparently due to the tin compounds acting as stabilizers and/or having catalytic activity at higher temperatures. For example, the optimum melt polymerization temperature for the titanate catalysts is about 235° to 285°C (preferably 244° to 265°C) and for the tin catalysts 235° to 315°C (preferably 265° to 295°C). The lower temperatures yield products having the least color while the higher temperatures yield higher molecular weight polymers and/or faster reactions. The tin catalysts also permit the attainment of a second stage I.V. of 1.5 in about one-half to one-fourth the time it takes to reach a second stage I.V. of 1.5 with the titanate catalysts. All of these catalysts can be used in a concentration of 0.01 to 2 parts by weight (preferably 0.1 to 0.5 parts by weight) per 100 parts by weight N-hydroxyethyl trimellitic acid imide.

The N-hydroxyethyl trimellitic acid imide can be polymerized in a one or two stage process. In either case, the N-hydroxyethyl trimellitic acid imide is polymerized in a melt at a temperature of 225 to 340°C. In the two stage process, the solidified first stage polymer is ground or pelletized and then polymerized further at a temperature of 200 to 275°C while maintaining the polymer in a solid state. Other things being equal, the two stage process permits the production of polymers having a higher I.V. than that obtainable in a one stage process. The higher molecular weight is attainable since the larger surface area in the second stage polymerization facilitates removal of water.

In the preferred method of producing of polymers of this invention starting with ethanol amine and trimellitic acid compound, the trimellitic acid compound, preferably anhydride, is dissolved or dispersed in a suitable solvent (such as dimethyl formamide) or diluent (such as water) and one mole of ethanol amine is added per mol of trimellitic acid compound. After all the ethanol amine is added, the solvent or diluent is removed, usually under vacuum. The polyesterification catalyst can be added at the same time as the ethanol amine or, if desired, after the solvent is removed. The N-hydroxyethyl trimellitic acid imide and/or the partially condensed reactants are melt polymerized at a temperature of 200° to 315°C, preferably under vacuum. The melt polymerization is continued until the polymerization reaches an equilibrium, usually about 1 to 6 hours. The maximum first stage I.V. of (a) uncatalyzed reactions is about 0.15, (b) of titanate catalyst is about 0.4, (c) of tin catalyst about 0.7, and (d) antimony catalyst about 0.8. In general the higher the I.V. of the polymer in the first stage, the higher the polymer melting point and the easier it is to maintain the polymer in the solid state during the second polymerization.

The solid state polymerization, which is carried out below the melting point of the polymer, can be conducted in several ways. However, all of the techniques require heating the ground or pelletized polymer below the polymer melting point, generally 200° to 275°C while either sparging with an inert gas, such as nitrogen or air, or operating under a vacuum. As indicated above, these conditions facilitate the removal of water from the polymer and thereby enhance polymer chain growth.

Substantially any one or more thermally stable magnet wire enamels can be used as subbing layers for the self-bonding poly(ethylenetrimellitate imide) top coats. As indicated above, suitable subbing layers include polyesters, polyesterimides, polyamideimides, polyimides, etc.; see for example U.S. Pat. Nos. 3,022,200 of Koerner, et al.; 3,371,009 of Traynor, et al.; 3,428,486 of George; 3,475,212 of Bach, all of which patents are incorporated by reference. A particular useful combination is to employ a polyester laver or layers directly in contact with the magnet wire and higher thermally rated enamels as the outer enamel layer. For example, it is desirable to have a polyester enamel subbing layer in direct contact with the magnet wire and either a polyimide or polyamideimide enamel layer in direct contact with the polyester layer and the poly(ethylenetrimellitate imide) top coat. Of course, each of these layers may be formed by one or more applications of the particular polymer.

The thermally stable enamels and the poly(ethylenetrimellitate imides) can be applied to magnet wire by passing the wire through the polymer solution, through a suitable die and then through an oven maintained at an elevated temperature to cure and/or dry the resins on the wire. Where desired, the wire may be passed through the polymer solution and dies a number of times and through the oven after each pass through the polymer solution. In this way a thicker polymer buildup is obtainable than can be obtained with only a single pass through a polymer solution. Typically the die provides a clearance of from about 2 to 4 mils around the wire. The speed at which the wire is passed through the polymer solution and the temperature at which the oven is maintained depends upon the particular polymer solution employed, the buildup of polymer desired, the length of the oven in which the coated wire is cured and/or dried and the molecular weight of the polymer used in the coating operation. The various parameters for applying the thermally stable enamels are well known by practitioners in this industry and particularly efficacious combinations of enamels and operating conditions can be determined by routine experimentation.

The self-bonding poly(ethylenetrimellitate imides) are preferably applied from a 10 to 30 percent by weight solution of an organic solvent such as cresylic acid or meta-cresol or mixtures of these with xylenes, at a rate of 20 to 100 feet per minute and dried at a temperature of 250° to 500°C before winding the wire and fabricating the wound magnet wire into the desired electrical component.

After fabrication of the electrical component, the thermoplastic poly(ethylenetrimellitate imides) coatings can be bonded together at a temperature of 200° to 300°C or higher for approximately 60 minutes to 5 minutes. In general, the higher the fusion temperature the shorter the heating time. Surprisingly, the poly(ethylenetrimellitate imide) coatings can also be bonded together by passing sufficient current through the wire to raise the wire temperature to about 200° to 400°C.

The following examples are merely illustrative.

EXAMPLE I

Eighteen gauge (.0403 inch diameter) copper AWG wire, annealed at 750°F under nitrogen, was coated in a G.E. laboratory Model Type M Wire Tower by passing the annealed wire at 40 to 50 feet per minute through a 30% solids room temperature bath of an ethylene glycol/trishydroxyethyl isocyanurate terephthalate polyester (Isonel 200 XWE 490) in cresylic acid and dried in a two stage 15-foot oven where the first 7½ feet of the oven was maintained at 500°F and the second half of the oven was maintained at 850°F. Four coats of polyester were applied in this manner thereby increasing the wire diameter by 2.2 mils. Two layers of a trimellitic anhydride/methylene bisaniline/-methylene bisaniline diisocyanate amideimide polymer of the type described in Hanson et al. Application Ser. No. 348,868 filed Apr. 4, 1973, now U.S. Pat. No. 3,847,878, which is incorporated by reference, were applied in essentially the same manner by passing the polyester coated wire through a 25% solids room temperature bath of the amideimidepolymer in a 2:1 weight ratio of N-methylpyrolidone:xylene and dried in the two stage oven at 500°F and 850°F thereby increasing the enamel layer diameter an additional 0.8 mils. Two bond coats of homopolymeric poly(ethylenetrimellitate imide) having an I.V. of about 0.45 were applied in essentially the same manner by passing the enameled copper wire through a room temperature 21–22% solids bath of poly(ethylenetrimellitate imide) in a 2:1 weight ratio of cresylic acid:xylene and drying at 500°F and 850°F to increase the wire diameter 0.6 to 0.8 mils.

The magnet wire was wound, fused and tested according to N.E.M.A. Magnet Wire Standards MW-1000-1973 except using 225°C as bonding temperature with the results set forth below in Table I:

EXAMPLE II

Example I was repeated except that the magnet wire was passed through the baths at 40 feet per minute instead of 50 feet per minute. The results are set forth below in Table I:

Table I

| Test | NEMA Spec. | Ex. I | Ex. II |
|---|---|---|---|
| 20% JERK + MANDREL | 3X MAX | 1X | 1X |
| SNAP + MANDREL | PASS | 3X | 2X |
| BURN OUT, OFM | AT LEAST 6.8 | 7.7 | 9.8 |
| DIELECTRIC STRENGTH | 5700 VOLTS | 11,000 VOLTS | 10,000 VOLTS |
| UNILATERAL SCRAPE | 1150 grams | 1450 grams | 1340 grams |
| BOND STRENGTH IN KILOGRAMS | 9 Min | 14 | 14 |

The above data illustrates that poly(ethylenetrimellitate imide) is an excellent self-bonding top coat varnish.

EXAMPLE III

Example I was repeated according to the twisted pair bond strength test of the N.E.M.A. Magnet Wire Standards MW-1000-1972 with essentially the same results except that the self-bonding poly(ethylenetrimellitate imide) top coat varnish was cured by resistance heating using a Techrand Burnout tester set at 36 amps for (A) 30 seconds and (B) 60 seconds.

EXAMPLE IV

Example I was repeated except that six coats of the polyester was applied as the enamel layer and the magnet wire was passed through the baths at 45 feet per minute. The results are set forth below in Table II.

Table II

| Test | NEMA Spec. | Ex. IV |
|---|---|---|
| 20% JERK + MANDREL | 3X MAX | 1X |
| SNAP + MANDREL | PASS | 1X |
| BURN OUT, OFM | AT LEAST 4.3 | 6.8 |
| DIELECTRIC STRENGTH | 5700 VOLTS | 12,000 VOLTS |
| BOND STRENGTH IN KILOGRAMS | 9 Min | 12 |

EXAMPLE V

Example I was repeated except that six coats of Isomid (a polyesterimide) was applied from a 30% solids cresylic acid bath as the enamel layer and the magnet wire was passed through the baths at 45 feet per minute. The results are set forth below in Table III:

Table III

| Test | NEMA Spec. | Ex. V |
|---|---|---|
| 20% JERK + MANDREL | 3X MAX | 1X |
| SNAP + MANDREL | PASS | 1X |
| BURN OUT, OFM | AT LEAST 5.1 | 8.1 |
| DIELECTRIC STRENGTH | 5700 VOLTS | 12,000 VOLTS |
| BOND STRENGTH IN KILOGRAMS | 9 Min | 12 |

I claim:

1. Magnet wire bearing a continuous self-bonding varnish top coat comprising a poly(ethylenetrimellitate imide) having an inherent viscosity of at least 0.3 dl/g.

2. The article of claim 1, wherein said poly(ethylenetrimellitate imide) is a homopolymer having an inherent viscosity of at least 0.4 dl/g.

3. The article of claim 2, wherein said magnet wire bears at least one enamel subbing layer selected from the group consisting of a polyester, polyesterimide, polyimide and polyamideimide.

4. The article of claim 3, wherein said poly(ethylenetrimellitate imide) is a homopolymer having an inherent viscosity of at least 0.4 dl/g.

5. The article of claim 4, wherein a polyester enamel subbing layer is in direct contact with the magnet wire.

6. The article of claim 5, wherein a polyamideimide enamel subbing layer is in direct contact with the polyester subbing layer and poly(ethylenetrimellitate imide) top coat.

7. The article of claim 5, wherein a polyimide enamel subbing layer is in direct contact with the polyester subbing layer and poly(ethylenetrimellitate imide) top coat.

* * * * *